Sept. 5, 1933.  H. W. BUNDY  1,925,231
TUBING
Filed Jan. 21, 1930
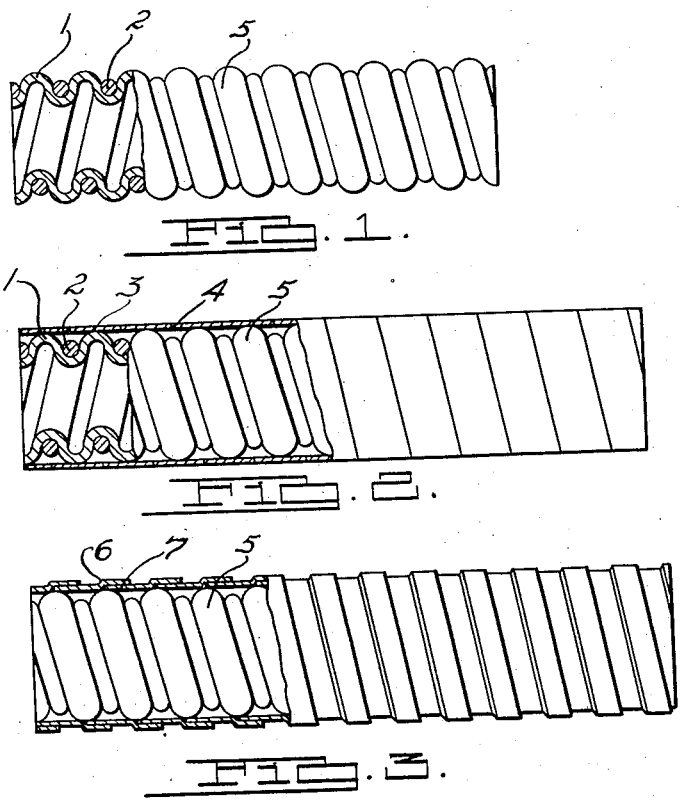
INVENTOR
*Harry W. Bundy.*
BY *Stuart C. Barnes*
ATTORNEY Patented Sept. 5, 1933

1,925,231

UNITED STATES PATENT OFFICE 1,925,231

TUBING

Harry W. Bundy, Detroit, Mich., assignor to Bundy Tubing Company, Detroit, Mich., a corporation of Michigan Application January 21, 1930. Serial No. 422,458

2 Claims. (Cl. 137—75)

This invention relates to tubing and it has to do especially with a tubing capable of withstanding shocks, vibration twisting, and weaving motions and the like.

The tube is designed for use in places where it is subjected to the above mentioned conditions as for example, oil and gas lines, or other tubes used in airplanes. Tubes in airplanes are subjected to the weaving action, vibration and the like, and of all places where tube failure is undesirable, an airplane can be cited as one of the foremost, especially if it is a gasoline line, because of the danger of fire.

The present invention contemplates a tube made of metal with a fluid-tight wall, which is as fluid-tight as a conventional tube for the purpose, but which is so constructed that it is capable of being bent, distorted, or twisted without rupture. In this regard the tube wall comprises essentially a metal which preferably is fairly ductile and which is of a corrugated formation; in conjunction with this construction a reinforcement structure is provided which effectively reinforces the tube but which is also equally capable of withstanding the above mentioned abuses.

In the accompanying drawing:

Fig. 1 is a view of a length of a tube constructed in accordance with the invention illustrating the tube partly in side elevation and partly in section.

Fig. 2 is a similar view illustrating a form which is modified, in that an outside casing is provided over what is shown in the structure of Fig. 1.

Fig. 3 is also a similar view showing a modified form of outside casing.

The tube proper is illustrated at 1 and it is formed of a wall which has an undulated or corrugated formation. Advantageously, these corrugations are of a helical formation; the helical corrugations can be rolled into the tube in a manner such as is understood by those versed in the art. This tube is preferably formed of a metal which is relatively ductile or which is capable of taking considerable distortion without breakage. The metal employed may be lead, copper, or an alloy suitable for the purpose.

The tube is reinforced by means of a helical wire wound onto the helically corrugated tube and seated in the furrows thereof. This wire is preferably of the springy nature, and of a nature so that it tends to relatively tightly seat in the furrows of the tube but not with too great a force such as would tend to collapse the tube walls. This wire may be of copper, bronze, steel, or suitable alloy. Such reinforcing wire is illustrated at 2.

Such a tube is capable of taking a bending action without in any way rupturing the tube wall, as a bend tends merely to shorten the radius of the curvature of ridges and furrows of the corrugation on the inside of the curve, and elongate the radius of the curvature on the outside of the curve. The helical coil of wire materially reinforces the tube from interior pressure and also from exterior blows, for while a blow on the exterior would strike the metal of the tube wall, yet it would not be entirely collapsed because the blow eventually would be resisted by the spring wire. The tube is very effective for withstanding the weaving action and vibration incident to the operation of airplanes.

In Fig. 2 the tube as shown comprises essentially the same parts as illustrated in Fig. 1 except for the addition of a further reinforcement and exterior. In this case the tube structure, as shown in Fig. 1, is provided with an outer tube structure for protecting the same. This outer tube structure may advantageously be composed of a helically wound strip 3. This strip may be composed of copper, steel, or an alloy although steel most probably would serve the purpose well on account of its strength. The windings are preferably such that adjacent convolutions abut or substantially abut at the point 4, preferably located above a furrow with the strip bridging the adjacent ridge and substantially contacting therewith as at 5.

The outside tube need not be sealed to form a fluid tight structure, and in this regard the helical windings need not be secured together, the edges as at 4 merely abutting each other or coming into close proximity. When this tube is bent, adjacent convolutions will be caused to separate slightly at the outside of the curve.

A further modified form is illustrated in Fig. 3 wherein the inner tube structure is constructed as heretofore pointed out. The outside tube structure may be composed of a helically wound strip of stock provided with an off-set 6, so that the adjacent edge 7 of the next adjacent convolution may lap thereunder. With this construction the convolutions lap each other so that when the tube is bent the convolutions may slide with respect to each other and still the outside cover remains closed with no spaces as probably may be the case as shown in Fig. 2. The outside casing in this form may be of copper, steel, or other metal and it is thought to be preferred that adjacent convolutions be not secured together.

I claim:

1. A one-piece tube structure comprising a tube wall of helically corrugated ductile metal, and an exterior protective covering therefor consisting of a tubular member composed of a helically wound strip of stock, adjacent convolutions of the helically wound strip of stock meeting substantially over the furrows of the corrugated member with the strip bridging the ridges of the corrugated member.

2. A tube comprising a tubular member of relatively ductile metal with the walls of the tube helically corrugated and formed of one continuous length of metal, a wire-like member of helical formation seated snugly in the corrugations, and an exterior tubular covering the inside surfaces of which contact at the top of the ridges of the corrugated tube.

HARRY W. BUNDY.